Nov. 11, 1958 E. A. SCHONROCK 2,860,006
TILTING DUMP TRAILERS FOR DETACHABLE FIFTH
WHEEL AND WINCH MOUNTING ASSEMBLY
Filed Feb. 23, 1954 4 Sheets-Sheet 3
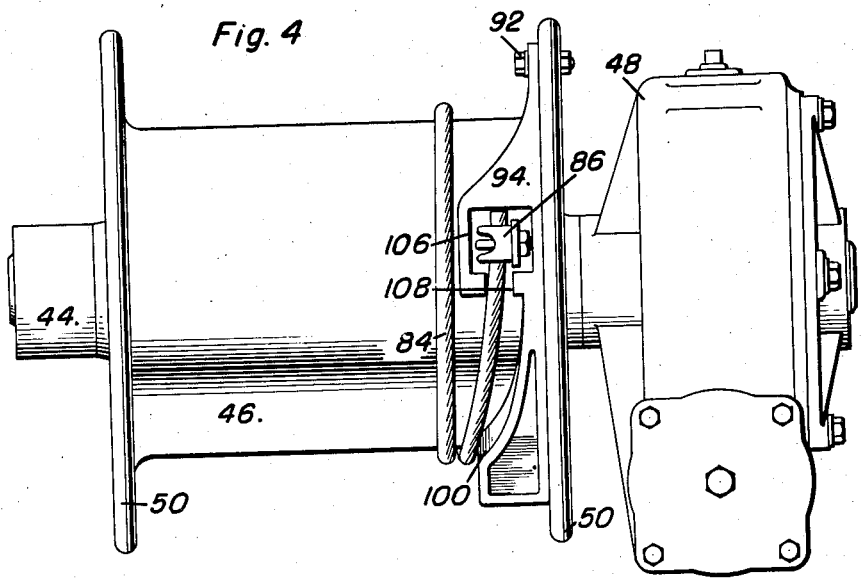
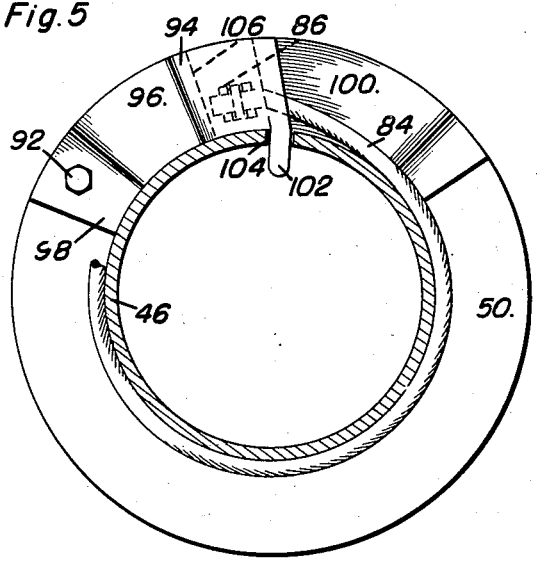
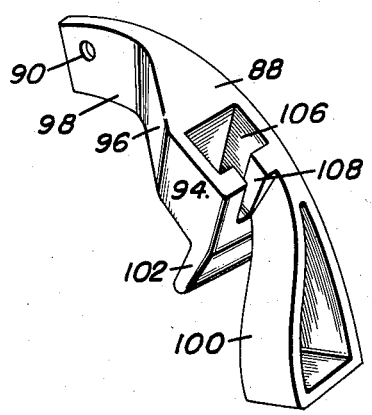
Edwin A. Schonrock
INVENTOR.
BY *Clarence A.O'Brien*
*and Harvey B. Jacobson*
Attorneys

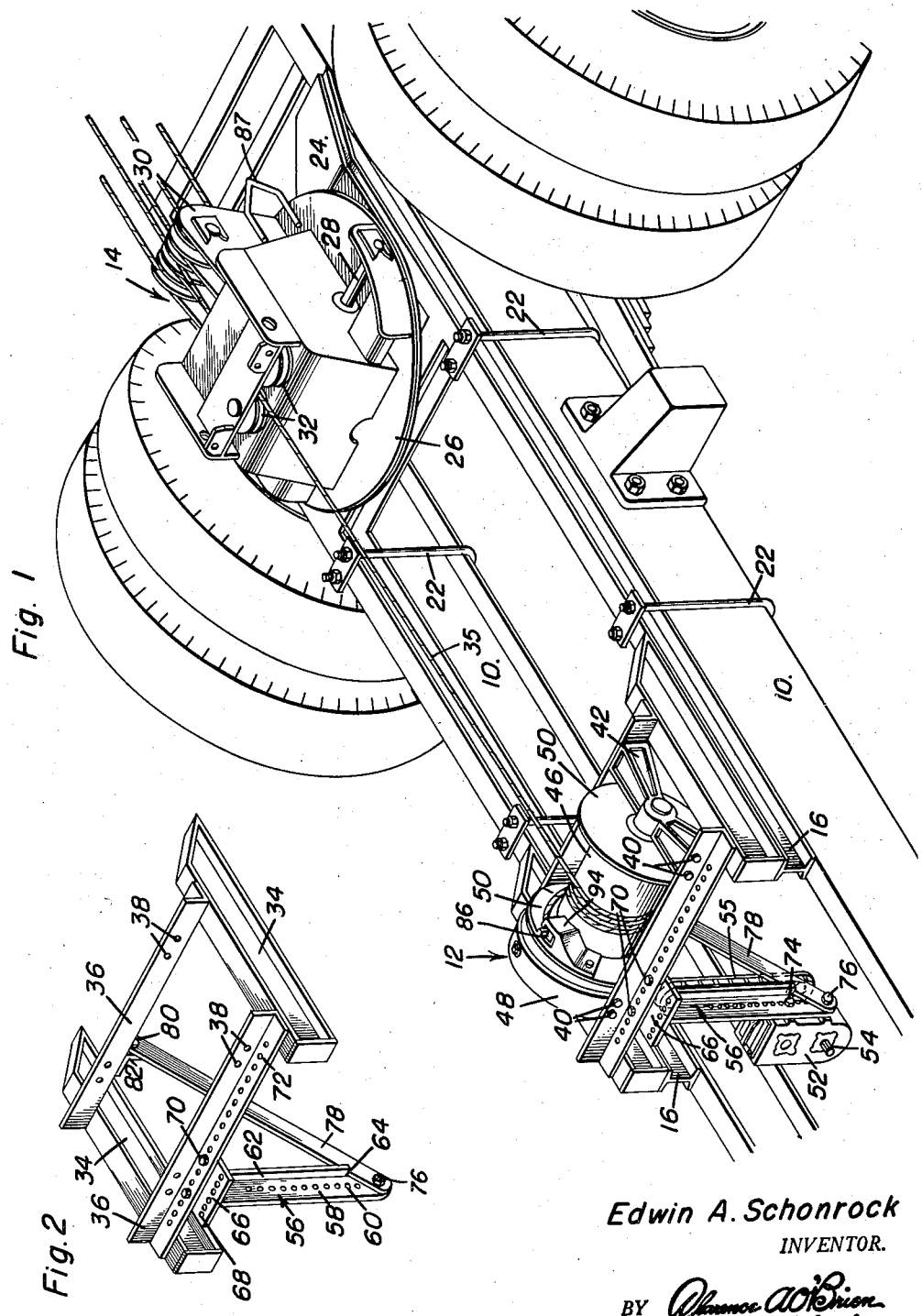

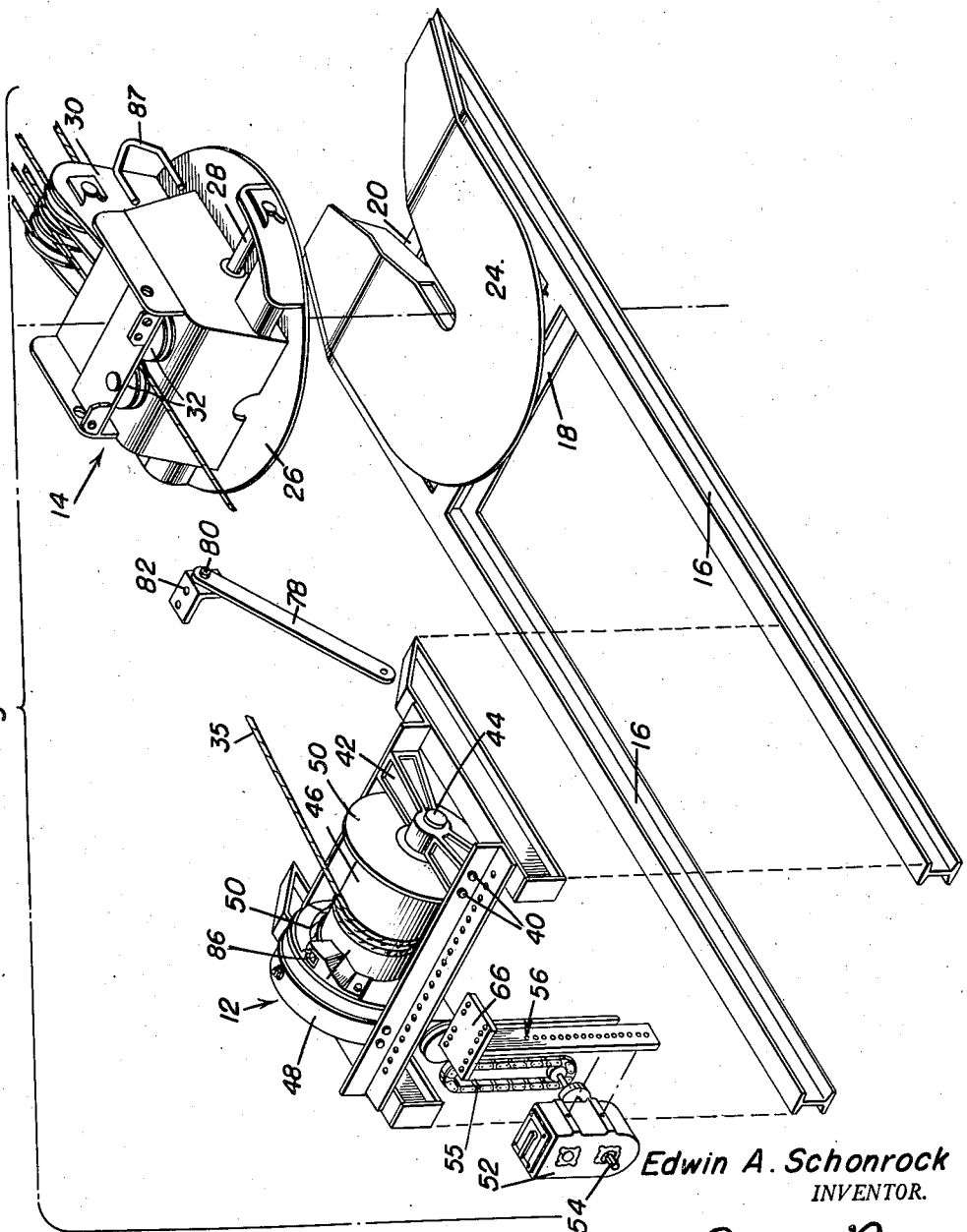

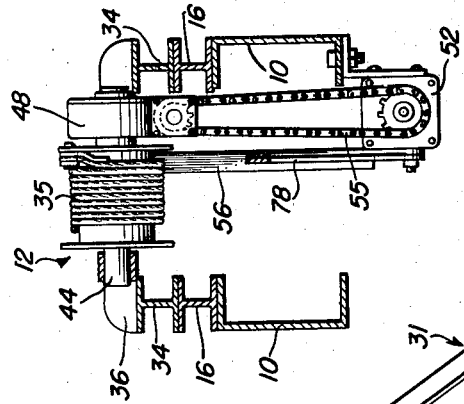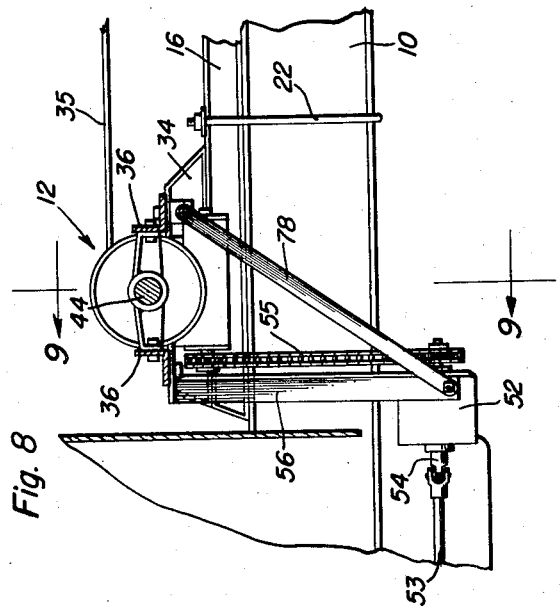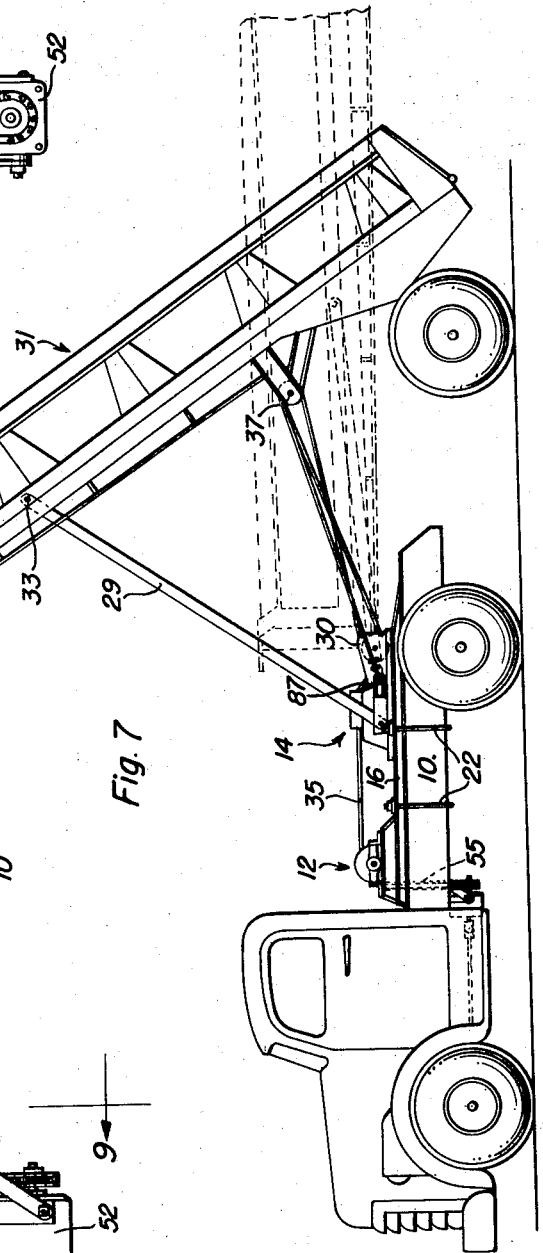

United States Patent Office 2,860,006
Patented Nov. 11, 1958

2,860,006

TILTING DUMP TRAILERS FOR DETACHABLE FIFTH WHEEL AND WINCH MOUNTING ASSEMBLY

Edwin A. Schonrock, San Angelo, Tex.

Application February 23, 1954, Serial No. 411,893

12 Claims. (Cl. 298—20)

This invention comprises novel and useful improvements in a combination quick detachable fifth wheel and winch mounting assembly and more specifically pertains to a sub-assembly which will facilitate the connection of a cable dump trailer to a tractor vehicle and the removal of the same therefrom.

The principal object of this invention is to provide a sub-assembly which may be readily applied to or removed from the chassis of a tractor vehicle as a unit, and which shall contain and mount in fixed relation thereon as a part thereof a fifth wheel assembly for a trailer, together with a winch for actuating the trailer lifting means of a cable dump trailer from a power take-off of the tractor vehicle.

Yet another object of the invention is to provide a sub-assembly in accordance with the foregoing objects wherein the winch assembly and the fifth wheel assembly thereof may be mounted and maintained in proper position to thereby facilitate the unitary application of the fifth wheel and winch assemblies to the chassis of a tractor vehicle and the removal of the same therefrom as required.

An additional specific object of the invention is to provide a removable sub-assembly in accordance with the preceding objects wherein the connecting means between the power take-off of the tractor and the winch operating mechanism may be mounted in adjusted positions and in an improved manner.

A further important object of the invention is to provide as a supplement to the foregoing objects a quick detachable connecting means between the lifting cable of a cable dump trailer and the winch assembly whereby the cable may be quickly connected to or released from the winch to thereby facilitate the attachment of the tractor to the cable dump trailer or its disconnection therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of the rear portion of the chassis of a conventional form of tractor showing the detachable unitary fifth wheel and winch mounting assembly in accordance with this invention applied thereto;

Figure 2 is a perspective view of the framework of the winch assembly, the winch and its supporting bearings and driving housing being removed therefrom;

Figure 3 is an exploded perspective view of the detachable unitary assembly forming the subject of this invention;

Figure 4 is an elevational view of the winch and its driving housing, and showing in particular the quick detachable cable connecting means, a portion of a cable being shown wound upon the winch and connected thereto;

Figure 5 is a vertical transverse sectional view through the embodiment of Figure 4 and showing more clearly the manner in which the cable is detachably connected to the winch;

Figure 6 is a perspective view of a retaining element by means of which the cable is detachably secured to the winch;

Figure 7 is a view in side elevation of a combined tractor and cable dump trailer incorporating therein the principles of this invention and showing in full and dotted lines respectively the trailer in its raised and in its lowered, load carrying positions;

Figure 8 is a view in vertical longitudinal section through a portion of the tractor unit and showing the driving connection for the winch assembly; and Figure 9 is a view in vertical transverse section, taken substantially upon the plane indicated by the section line 9—9 of Figure 8 and showing further details of the winch driving means.

The present invention is particularly concerned with a combined tractor vehicle and a cable dump trailer connected thereto, of a construction disclosed in detail in my prior Patent No. 2,661,236 of December 1, 1953, entitled Winch and Spring Suspension Construction for Dump Trailers. Since tractor and trailer combinations of the type set forth in my above identified patent are now well known in the art, and are fully described in my above set forth patent, the showing in Figure 7 will suffice for an understanding of the same and a further specific explanation and description of the construction and operation of the same appears to be unnecessary. It is with such a combination that the detachable sub-assembly in accordance with this invention is particularly designed, the present invention having as its chief aim the three specific purposes of first providing a sub-assembly which may be removably attached to the chassis of a tractor whereby a conventional automobile tractor may be adapted and converted for detachable connection with the cable dump type of trailer as set forth in my above patent; second, a construction whereby the cable employed to elevate the trailer to its dumping position may be quickly connected to or disconnected from the winch of the tractor when it is desired to couple or disconnect the trailer from the tractor; and third, wherein the draft and elevating connection between the tractor and trailer may be quickly connected or disconnected as desired.

The rear portion of a conventional form of automotive tractor is shown in Figure 1, the same including a chassis having the usual channel members 10 forming a part of the frame of the chassis, and to which channel members it has been customary to separately attach a fifth wheel assembly for detachable connection with a trailer and a winch assembly, as shown in my above identified prior patent, for use with a cable dump type of trailer. In converting conventional chassis for use with cable dump trailers it has been a time consuming and difficult job to secure the winch assemblies and the fifth wheel assemblies to the chassis frame members 10 with an adequately strong connection, and also at the exact desired spacing with respect to each other. Moreover, whenever it is necessary to remove one of these members for servicing or replacement, considerable labor is required for removing these elements and for reassembling the same in their proper relation. By the present invention this difficulty has been entirely overcome by permanently attaching the winch assembly and the fifth wheel assembly to a sub-assembly frame whereby these elements will be properly secured in the desired spaced relation with respect to each other, and then detachably connecting the entire sub-assembly frame to the chassis for quick removal or application thereto. Thus, when it becomes necessary for any reason to remove the winch assembly, the fifth wheel assembly or the entire sub-assembly for servicing or repairs, the same may be readily removed as a unit and a substitute unit installed with a minimum loss of time; or may be conveniently removed, repaired or serviced and then restored without any difficulty as to the proper positioning of the elements of the same.

For this purpose, the winch assembly indicated generally by the numeral 12 and a fifth wheel assembly indicated generally by the numeral 14 are secured to a sub-assembly frame, the same, as shown best in Figure 3, consisting of a pair of frame members 16 which may conveniently comprise conventional channel elements and which are rigidly connected to each other as by cross bars 18 and 20. The frame of the sub-assembly is mounted upon the chassis by positioning the channel member 16 of the frame assembly upon the channel members 10 of the chassis and removably securing the same together in any suitable manner as by a plurality of U-bolts 22 or the like. It is to be understood that although U-bolts have been illustrated, any other desired fastening means are regarded as equivalents for the purpose of this invention and may be employed where it is deemed preferable.

Rigidly mounted upon the rear portion of the sub-assembly frame is a bed plate member 24 forming a part of the usual fifth wheel assembly. The fifth wheel plate 26 is rotatably mounted upon the bed member 24 in the usual manner and upon its opposite sides is provided with a pair of aligned trunnions or pivot pins, one of which is shown at 28, whereby the conventional lift arms 29 of a trailer 31 as shown in Figure 7 and as set forth in my above-identified patent are detachably and pivotally connected at the front ends to the tractor vehicle by means of the fifth wheel assembly of the same, the other ends of said lift arms being pivoted to the trailer at 33.

Also mounted upon the fifth wheel assembly is a pulley sheave assembly 30 comprising actuating pulleys together with a guide pulley assembly comprising the guide pulleys 32. These pulley assemblies are connected with the usual lift cable 35 and to actuated pulleys 37 on the trailer which are employed to shorten the distance between the actuating and actuated pulleys and thereby elevate the lift arms and thereby the trailer body to a dumping position as set forth in my above-identified patent. As will be apparent, the guide and actuating pulley assembly together with the pivot pins of the lift arms are all carried by and are swingable horizontally with the fifth wheel assembly; and in turn are securely and rigidly mounted upon the frame of the sub-assembly at the rear end thereof.

Secured to the front end of the sub-assembly frame is the winch assembly 12. The latter includes a supporting frame, for the details of which attention is directed to Figures 2 and 3 in particular. This frame includes a pair of supporting frame members 34, each adapted to rest upon the upper surface of the forward portion of the channel-members 16 of the sub-assembly frame and to be secured thereto in any desired manner as by bolting, welding or the like. Cross members in the form of angle iron members 36 are secured to the upper surface of the front and rear portions of the winch assembly frame members 34 as by being bolted, welded or the like and their flanges are suitably apertured as shown. The vertical flanges have apertures 38 which receive bolts 40 whereby journal members 42 are removably secured therebetween and supported thereby.

Mounted upon the journal supports 42 as by pintles or axles 44 is a conventional form of winch drum 46 having any desired form of drive gear assembly, the housing of which is shown at 48 in Figure 4. The winch and its drive gearing may be of any conventional and known design, a detailed showing of the gearing is believed to be unnecessary. However, shown in Figures 1, 3, 8 and 9 is a satisfactory mechanism which I employ for this purpose.

The winch includes in addition to its cylindrical drum portion, a pair of annular, radial flanges 50.

In order to apply power from the power take-off of the tractor, not shown, to the gearing assembly within the housing 48 of the winch assembly, there is provided a reduction gearing assembly, of any conventional design and the housing of which is indicated by the numeral 52 and to which power is applied by a shaft 53. This housing is operatively connected by suitable sprocket gears and chain assembly 55 to the gearing within the housing 48, and includes a power input shaft 54 which is connected to the power shaft 53, and is releasably coupled in any suitable manner, as for example in the manner shown in the winch driving assembly of my above-identified prior patent, with the power take-off of the tractor.

In order to mount the reduction gear assembly 52 in proper position for connection with the winch operating gearing assembly of the housing 48 and with the power take-off shaft, not shown, of the tractor, an adjustable bracket construction is provided. This includes a vertical supporting bracket 56 which is of T-shaped cross-section, having a vertical plate 58 provided with a plurality of vertically spaced apertures 60 and a perpendicular vertical stiffening plate 62, which at its lower end is notched or cut away as at 64. Secured to the upper edges of the plates 58 and 62 is a third, perpendicular, horizontally disposed mounting plate 66 which is likewise provided with a plurality of apertures 68. These apertures, by means of the bolts 70 serve to adjustably secure the mounting bracket 56 to selected apertures 72 of the horizontal flange of the forward cross member 36. By means of the apertures 60, the reduction gearing assembly casing 52 is secured in selected vertical adjustment upon the bracket 56 as by a fastening bolt 74, a second bolt 76 being also employed for this purpose and to also detachably secure the lower end of a brace link 78 which extends into the notched portion 64 as shown clearly in Figure 2, and at its other end is secured as by a bolt 80 to a mounting bracket 82 which is secured as by bolts to the undersurface of the horizontal flange of the rearward cross member 36 of the winch assembly frame.

By this construction it will be apparent that the reduction gearing assembly is adjustably mounted both vertically and horizontally upon the winch assembly frame and may be operatively connected with the drive gear assembly of the winch.

In order to facilitate the attachment of a cable dump trailer to a tractor vehicle through the above described sub-assembly secured to the chassis of the tractor, and to facilitate the detachment of the trailer therefrom when desired, a quickly detachable connection between the cable of the dump trailer and the winch assembly is provided. This quick detachable connection is best shown in Figures 4–6, there being shown in Figures 4 and 5 an end portion 84 of the cable 35 which is operatively connected to the winch, is then adapted to pass through the guide pulley assembly 32 and the actuating pulley assembly 30 and from thence is connected to the actuated pulley assembly 37 of the trailer, as in the manner set forth in detail in my above-mentioned patent. The cable portion 84 at that end which is secured to the winch 46 is provided with a removable lug 86 of any conventional design. The other cable end is dead-ended to a bracket 87 on the fifth wheel. In order to perform a quick connection between this lug and the winch there is provided a keeper or retainer in the form of an arcuately disposed body 88, see Figure 6, which has one side flat and adapted to rest smoothly against the inside surface of one of the flanges 50 of the winch as shown in Figure 4, this body having one or more apertures 90 whereby the same may be bolted to the flange as by a bolt 92. The concave arcuate surface of the body 88 is such as to cause the same to snugly rest against and encircle a portion of the cylindrical surface of the winch drum 46. Intermediate its ends the body 88 is provided with a laterally enlarged portion 94 which has an inclined vertical surface 96 by which the same is smoothly merged into the end portion 98 of the body in which the aperature 90 is disposed.

At the opposite side of the body portion 94 from the curved surface 96, the body is provided with a further curved surface 100. Depending from the portions 94 is an axially and radially extending rib or ridge 102 which is adapted to be received in a slot 104, see Figure 5, formed in the surface of the winch drum 46 adjacent the flange 50. The rib 102 assists the bolts 92 in detachably securing the retainer for the detachable cable connection.

Extending downwardly into the body 94 from the upper surface thereof is a recess or socket 106 of any suitable dimensions and which is adapted to loosely receive the cable fastening lug 86 as will be apparent from Figures 4 and 5. Opening from what may be termed a rear wall of the socket 106 is a circumferentially extending slot or notch 108, which serves to permit the end of the cable containing the fastener 86 to pass into the socket and permit the lug to be received with the socket, as shown clearly in dotted lines in Figure 5.

This quick detachable cable fastening means as will be apparent from Figure 4 is secured at one side of the winch where it will not interfere with the winding of the cable upon the same. In operation it is merely necessary to insert the slack end of the cable portion 84 containing the lug 86 into the socket 106 and the slot 108 whereupon rotation of the winch will serve to tighten and wind the cable about the same. In order to release the cable it is merely necessary to unwind the winch sufficiently to produce slackness in the end of the cable, which may then be quickly lifted from the socket and thereby pulled from the winch.

By this construction, a trailer of the cable dump type as illustrated in my prior patent may be readily completely disconnected from the tractor by releasing the latch on the king pin, not shown, whereby the upper plate 26 of the fifth wheel assembly may be disconnected from the tractor mounted plate 24 in the usual manner; disengaging the lug 86 from the socket 106; and thereafter driving the tractor away from the trailer. The reverse operation may be performed whereby a tractor may be quickly connected to a trailer for transporting and handling the same.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a tractor and cable dump trailer assembly, a tractor having a frame, a sub-assembly frame, means detachably mounting the sub-assembly frame upon the rear portion of said tractor frame, a fifth wheel assembly lower plate fixedly mounted upon the rear portion of said sub-assembly frame, a fifth wheel assembly upper plate detachably pivoted upon said lower plate, a winch assembly mounted upon the front end of said sub-assembly frame, means connecting said winch assembly to a source of power, a set of actuating pulleys and a set of guide pulleys rotatably journaled upon said upper plate, a cable connected to said winch assembly and reeved through said guide pulleys and through said actuating pulleys for connection to said trailer unit.

2. The combination of claim 1 wherein said sub-assembly frame has a pair of cross members upon which said winch assembly is mounted, said winch assembly connecting means including a reduction gear assembly connected to said source of power and to said winch assembly, means supporting said reduction gear upon said cross members in a position disposed therebeneath.

3. The combination of claim 1 wherein said winch assembly connecting means includes a reduction gear assembly connected to said source of power and to said winch, means supporting said reduction gear assembly from the forward end of said sub-assembly frame and therebeneath.

4. The combination of claim 1 wherein said winch assembly connecting means includes a reduction gear assembly connected to said source of power and to said winch, means supporting said reduction gear assembly from the forward end of said sub-assembly frame and therebeneath, said sub-assembly frame including a cross member, said supporting means including a support plate carried by said cross member and depending therefrom, means securing said reduction gear assembly in vertically adjustable positions upon said support plate.

5. The combination of claim 1 including a pair of cross members supported by the forward end of said sub-assembly frame, said winch assembly including a drum having oppositely disposed axially extending axles, journal members on said cross members rotatably supporting said axles, said drum being disposed between said cross members and between said journal members.

6. The combination of claim 1 wherein said winch assembly includes a winch drum, a quick detachable connector releasably attaching said cable to said drum.

7. A tractor and cable dump trailer assembly comprising a tractor, a trailer and a fifth wheel assembly connected therebetween, said tractor having a frame, a sub-assembly frame, means detachably mounting the sub-assembly frame upon the rear portion of said tractor frame, a fifth wheel assembly lower plate fixedly mounted upon the rear portion of said sub-assembly frame, a fifth wheel assembly upper plate detachably pivoted upon said lower plate, a winch assembly mounted upon the front end of said sub-assembly frame, means connecting said winch assembly to a source of power, a set of actuating pulleys and a set of guide pulleys rotatably journaled upon said upper plate, a set of actuated pulleys rotatably journaled upon said trailer, lifting means pivoted to said upper plate and to said trailer for raising the forward end of the trailer upwardly when the distance between the fifth wheel assembly and said set of actuated pulleys is shortened, a cable connected to said winch and reeved through said guide pulleys, actuating pulleys and actuated pulleys and effective upon operation of said winch to shorten said distance.

8. The combination of claim 7 wherein said sub-assembly frame has a pair of cross members upon which said winch assembly is mounted, said winch assembly connecting means including a reduction gear assembly connected to said source of power and to said winch assembly, means supporting said reduction gear upon said cross members in a position disposed therebeneath.

9. The combination of claim 7 wherein said winch assembly connecting means includes a reduction gear assembly connected to said source of power and to said winch, means supporting said reduction gear assembly from the forward end of said sub-assembly frame and therebeneath.

10. The combination of claim 7 wherein said winch assembly connecting means includes a reduction gear assembly connected to said source of power and to said winch, means supporting said reduction gear assembly from the forward end of said sub-assembly frame and therebeneath, said sub-assembly frame including a cross member, said support means including a support plate carried by said cross member and depending therefrom, means securing said reduction gear assembly in vertically adjustable positions upon said support plate.

11. The combination of claim 7 including a pair of cross members supported by the forward end of said sub-assembly frame, said winch assembly including a drum having oppositely disposed axially extending axles, journal members on said cross members rotatably supporting said axles, said drum being disposed between said cross members and between said journal members.

12. The combination of claim 7 wherein said winch assembly includes a winch drum, a quick detachable connector releasably attaching said cable to said drum.

References Cited in the file of this patent

UNITED STATES PATENTS

| | | | |
|---|---|---|---|
| 2,193,407 | Hagen | Mar. 12, | 1940 |
| 2,329,943 | Robins | Sept. 21, | 1943 |
| 2,421,788 | Henry | June 10, | 1947 |
| 2,542,795 | Clement | Feb. 20, | 1951 |
| 2,635,919 | Watson | Apr. 21, | 1953 |
| 2,661,236 | Schonrock | Dec. 1, | 1953 |